United States Patent
Izumi et al.

(10) Patent No.: US 8,294,309 B2
(45) Date of Patent: Oct. 23, 2012

(54) ELECTRICAL ROTATING MACHINE

(75) Inventors: Mitsuaki Izumi, Hitachinaka (JP);
Toshio Ishikawa, Hitachinaka (JP);
Yosuke Umesaki, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 222 days.

(21) Appl. No.: 12/781,386

(22) Filed: May 17, 2010

(65) Prior Publication Data

US 2010/0320878 A1   Dec. 23, 2010

(30) Foreign Application Priority Data

Jun. 18, 2009   (JP) ................. 2009-144859

(51) Int. Cl.
*H02K 9/06* (2006.01)
*H02K 5/20* (2006.01)
(52) U.S. Cl. .................... 310/60 R; 310/63; 310/89
(58) Field of Classification Search ............ 310/62–63, 310/89, 60 R
See application file for complete search history.

(56) References Cited

U.S. PATENT DOCUMENTS

| | | | | |
|---|---|---|---|---|
| 1,654,305 | A | * | 12/1927 | Nottage ............ 310/52 |
| 5,903,073 | A | * | 5/1999 | Mukai ............ 310/64 |
| 6,018,205 | A | * | 1/2000 | Ohashi et al. ........ 310/52 |
| 7,122,927 | B2 | * | 10/2006 | Sugitani ............ 310/89 |
| 7,138,735 | B2 | * | 11/2006 | Vasilescu ........... 310/58 |
| 7,723,876 | B2 | | 5/2010 | Ito et al. |
| 2007/0222311 | A1 | | 9/2007 | Vasilescu |
| 2008/0061639 | A1 | * | 3/2008 | Koike et al. ........ 310/63 |
| 2008/0303361 | A1 | * | 12/2008 | Ito et al. ........... 310/62 |

FOREIGN PATENT DOCUMENTS

| | | | |
|---|---|---|---|
| DE | 10-2008 003 460 A1 | | 12/2008 |
| EP | 0 539 339 | * | 10/1992 |
| EP | 0 634 829 | * | 1/1995 |
| EP | 0 823 769 A1 | | 2/1998 |
| FR | 2 602 925 | * | 2/1988 |
| JP | 9-172752 A | | 6/1997 |
| JP | 2005-273458 | * | 10/2005 |
| JP | 2009-5420 A | | 1/2009 |

OTHER PUBLICATIONS

European Search Report dated Dec. 16, 2011 (nine (9) pages).

* cited by examiner

*Primary Examiner* — Burton Mullins
(74) *Attorney, Agent, or Firm* — Crowell & Moring LLP

(57) ABSTRACT

A direction in which cooling air generated by a cooling fan flows to be discharged is perpendicular or nearly perpendicular to a direction in which diffusers are inclined. Thus, airflow resistance is increased by the diffusers, and the cooling air cannot be efficiently discharged from discharge ports provided circumferentially in an outer peripheral portion of a housing. Further, a stator coil cannot be sufficiently cooled. An electrical rotating machine includes: a rotor having a cooling fan on an end face of the rotor; a stator that is arranged opposite the rotor and has a stator coil with a rotation clearance provided between the stator and the rotor; a housing that holds the rotor and the stator; a plurality of intake ports that are provided in a side wall portion of the housing; a plurality of discharge ports that are provided circumferentially in an outer peripheral portion of the housing; and a plurality of diffusers that are provided circumferentially on an inner wall surface of a corner portion of the housing, the diffusers inclining toward the side opposite to a rotational direction of the rotor.

5 Claims, 4 Drawing Sheets

ROTATIONAL DIRECTION OF ROTOR ←

ROTATIONAL DIRECTION OF ROTOR →

ELECTRICAL ROTATING MACHINE

BACKGROUND OF THE INVENTION

1. Field of the Invention

The present invention relates to an electrical rotating machine including a cooling fan.

2. Description of the Related Art

In order to reduce the size of an electrical rotating machine and increase power of the electrical rotating machine, an electrical rotating machine with a built-in fan grows in demand. A conventional electrical rotating machine cannot compensate for a temperature increased by self-heat generation.

To avoid this, JP-9-172752-A (page 6 [0041-0046], FIGS. 1 and 2) describes a generator having a plurality of rectifying guides (hereinafter referred to as diffusers) on an inner wall surface of a corner portion of a frame (housing) that forms a stator.

In FIGS. 1 and 2 of JP-9-172752-A, adjacent pairs of the rectifying guides are arranged at equal intervals, and the rectifying guides are inclined at a predetermined angle toward a rotational direction of a cooling fan with respect to a radial direction of a shaft, thereby improving the effect of adjusting cooling air.

SUMMARY OF THE INVENTION

According to JP-9-172752-A, the diffusers are inclined toward a rotational direction of a rotor. That is, the cooling air generated by the cooling fan is discharged toward the outside of the generator in a direction nearly perpendicular to the direction in which the diffusers are inclined. Thus, airflow resistance is increased by the diffusers. The cooling air cannot be efficiently discharged from a plurality of discharge ports circumferentially arranged on outer peripheral portions of front and rear housings. Therefore, a stator coil cannot be sufficiently cooled.

An object of the present invention is to provide an electrical rotating machine that uses a built-in cooling fan to exhibit improved performance in cooling a stator coil.

A desirable aspect of the present invention is described below to solve the aforementioned problem.

The electrical rotating machine includes: a rotor having a cooling fan on an end face of the rotor; a stator that is arranged opposite the rotor and has an stator coil with a rotation clearance provided between the stator and the rotor; a housing that holds the rotor and the stator; a plurality of intake ports that are provided in a side wall portion of the housing; a plurality of discharge ports that are provided circumferentially in an outer peripheral portion of the housing; and a plurality of diffusers that are provided circumferentially on an inner wall surface of a corner portion of the housing, the diffusers inclining toward the side opposite to a rotational direction of the rotor.

The present invention provides the electrical rotating machine that uses a built-in cooling fan to exhibit improved performance in cooling a stator coil.

DESCRIPTION OF THE PREFERRED EMBODIMENTS

An embodiment of the present invention is described below with reference to FIGS. 1 to 6.

Figure 1:
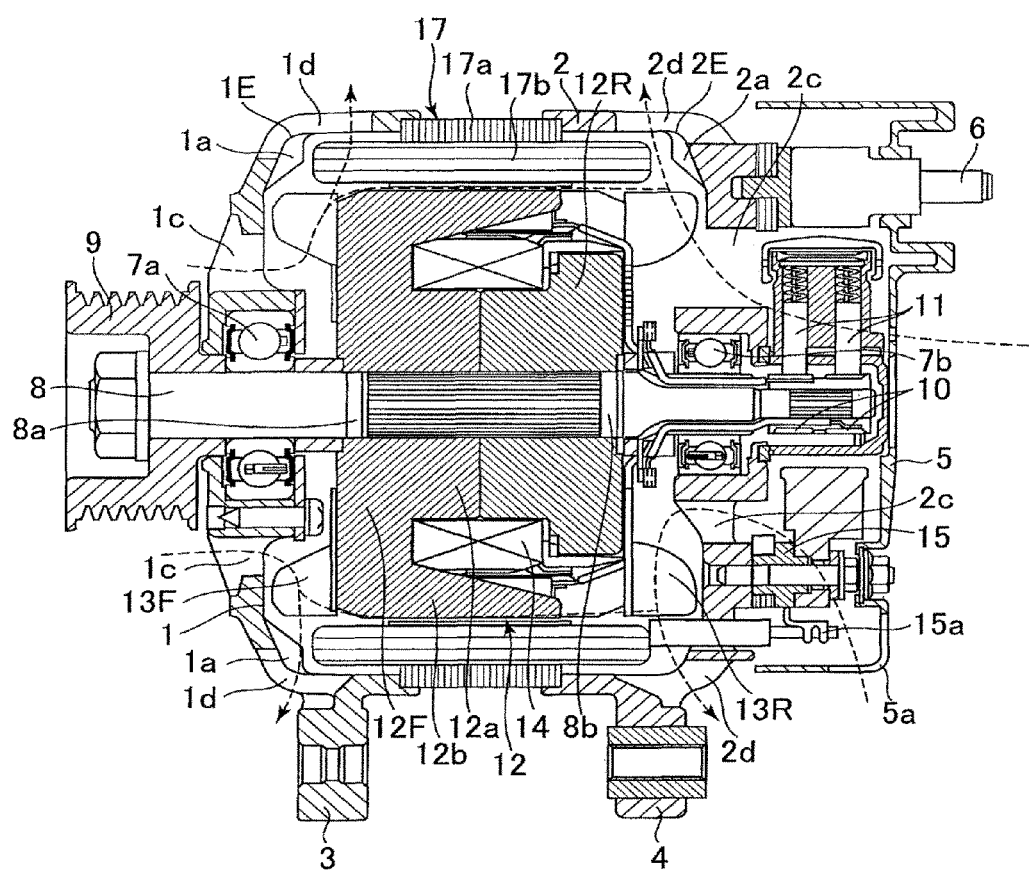
FIG. 1 is a vertical cross sectional view of an alternator for a vehicle.

As shown in FIG. 1, each of a front housing 1 and a rear housing 2 has an inner storage space and a bottom surface and is formed in a cylindrical shape or bowl shape. The front housing 1 has a fixing section 3 integrated with the front housing 1. The rear housing 2 has a fixing section 4 integrated with the rear housing 2. Each of the fixing sections 3 and 4 has a fixing hole. The fixing section 3 protrudes on an outer circumferential side of the front housing 1 in a radial direction of the front housing 1. The fixing section 4 protrudes on an outer circumferential side of the rear housing 2 in a radial direction of the front housing 2. The fixing sections 3 and 4 are attached to a vehicle by means of bolts (not shown). Each of the front and rear housings 1 and 2 is made of an aluminum alloy and molded by die casting.

A rear cover 5 is attached to one of end portions (separated from each other in the direction of a rotational axis of the rear housing 2) of the rear housing 2 and is thinner than each of the front and rear housings 1 and 2. The rear cover 5 has an inner storage space and a bottom surface and is formed in a cylindrical shape or bowl shape in a similar fashion to the housings. The rear cover 5 has a plurality of intake ports (openings) 5a on inner and outer circumferential sides thereof. Air flows through the intake ports 5a. A terminal 6 to be connected to a battery is attached to the outer circumferential side of the rear cover 5. The rear cover 5 is made of resin or an aluminum alloy.

A ball bearing 7a is attached to one of outer end portions (separated from each other in the direction of a rotational axis of the front housing 1) of the front housing 1 and located near the radial center of the front housing 1, while a ball bearing 7b is attached to one of outer end portions (separated from each other in the direction of the rotational axis of the rear housing 2) of the rear housing 2 and located near the radial center of the rear housing 2. The diameter of the ball bearing 7a is larger than the diameter of the ball bearing 7b.

A shaft 8 extends through an inner ring of the ball bearing 7a and an inner ring of the ball bearing 7b. The shaft 8 is capable of rotating relative to the front and rear housings 1 and 2 and held by the ball bearings 7a and 7b.

A pulley 9 is fixed to the shaft 8 by a bolt on the side of the front housing 1 so that the shaft 8 and the pulley 9 are capable of rotating in an integrated manner. The pulley 9 serves as a rotation transfer member. A rotation of an engine (not shown) is transferred to a crank pulley. Then, the rotation of the engine is transferred from the crank pulley to the pulley 9 through a belt that serves as an endless transfer belt. The shaft 8 is rotated by the rotation of the pulley 9. The rotational rate of the shaft 8 is proportional to the rotational rate of the engine and a pulley ratio of the pulley 9 and the crank pulley.

Two slip rings 10 are attached to an end portion of the shaft 8 on the side of the rear housing 2 so that the slip rings 10 and the shaft 8 are capable of rotating in an integrated manner.

Power is supplied through two brushes 11 to the slip rings 10. The brushes 11 slide while being pushed by the respective slit rings 10.

A front rotor core 12F and a rear rotor core 12R join the shaft 8 in a serrated manner at a substantially central portion (in the direction of a rotational axis of the shaft 8) of the shaft 8 so that the rotor cores 12F and 12R and the shaft 8 are capable of rotating in an integrated manner. In this case, the front rotor core 12F joins a portion of the shaft 8, while the rear rotor core 12R joins another portion of the shaft 8. Each of the rotor cores 12F and 12R is made of a magnetic material and molded. An outer end portion of the front rotor core 12F plastically flows in an annular groove 8a formed in the shaft 8 so that a movement of the front rotor core 12F in the direction of the rotational axis of the shaft 8 is restricted under the condition that the rotor cores 12F and 12R face each other in the direction of the rotational axis of the shaft 8 and are in contact with each other. An outer end portion of the rear rotor core 12R plastically flows in an annular groove 8b formed in the shaft 8 so that a movement of the rear rotor core 12R in the direction of the rotational axis of the shaft 8 is restricted under the condition that the rotor cores 12F and 12R face each other in the direction of the rotational axis of the shaft 8 and are in contact with each other. The front-side and rear rotor cores 12F and 12R fixed to the shaft 8 in the above-described way form a rotor 12.

A plate-shaped front fan 13F and a plate-shaped rear fan 13R are attached to respective end faces (separated from each other in the direction of a rotational axis of the rotor 12) of the rotor 12. The front fan 13F has a plurality of blades on an outer circumferential side of the front fan 13F. The rear fan 13R has a plurality of blades on an outer circumferential side of the rear fan 13R. The fans 13F and 13R and the rotor 12 rotate in an integrated manner.

Each of the front rotor core 12F and the rear rotor core 12R includes a shaft portion 12a and a plurality of rotor core claw magnetic poles 12b. The shaft portions 12a are located on inner sides of the rotor cores 12F and 12R. The rotor core claw magnetic poles 12b are located on outer sides of the rotor cores 12F and 12R. Each of the rotor core claw magnetic poles 12b has an L shape in a cross section taken along a radial direction of the rotor 12. One of ends (separated from each other in the direction of the rotational axis of the rotor 12) of the shaft portion 12a of the rotor member 12F faces and is in contact with one of ends (separated from each other in the direction of the rotational axis of the rotor 12) of the shaft portion 12a of the rotor member 12R so that the front rotor core 12F and the rear rotor core 12R form a Lundell-type iron core. A field coil 14 is provided between outer circumferences of the shaft portions 12a and inner circumferences of the rotor core claw magnetic poles 12b and wound around the rotational axis of the rotor 12. Both ends of the field coil 14 extend along the shaft 8 and are connected to the respective two slip rings 10. The brushes 11 supply field currents through the slip rings 10 to the field coil 14. The currents (that are to be supplied to the field coil 14) are controlled on the basis of the state of the battery so that when a generated voltage is higher than a voltage of the battery included in the vehicle, power generation starts. An IC regulator (not shown) controls the generated voltage so that a voltage applied to the terminal 6 is constant. The IC regulator is located in a rectification circuit 15 (described later) provided in the rear cover 5 and serves as a voltage control circuit.

A stator 17 is sandwiched between the front housing 1 and the rear housing 2 and fixed to the front housing 1 and the rear housing 2. An inner circumference of the stator 17 faces outer circumferences of the rotor core claw magnetic poles 12b while there are small gaps between the inner circumference of the stator 17 and the outer circumferences of the rotor core claw magnetic poles 12b.

The stator 17 includes a stator core 17a and a stator coil 17b. The stator core 17a is made of a magnetic material. The stator coil 17b is wound around the stator core 17a. The stator coil 17b of each phase is connected to the rectification circuit 15 located in the rear cover 5. The rectification circuit 15 is connected to the battery through the terminal 6.

The rectification circuit 15 includes a plurality of rectifier. The rectifiers form a three-phase coil. Thus, six rectifiers perform full-wave rectification.

Next, the rotor 12 is described below in detail. As shown in FIG. 1, the front rotor core 12F and the rear rotor core 12R form the rotor 12. Each of the rotor cores 12F and 12R includes the plurality of rotor core claw magnetic poles 12b (specifically, six claw magnetic poles 12b) arranged in the circumferential direction of the rotor 12. The rotor core claw magnetic poles 12b are located on the outer sides of the shaft portions 12a and have an L shape in the cross section taken along the radial direction of the rotor 12. The rotor core claw magnetic poles 12b (extending from the front rotor core 12F) and the rotor core claw magnetic poles 12b (extending from the rear rotor core 12R) are alternately arranged in the circumferential direction of the rotor 12. The number of all the rotor core claw magnetic poles 12b is 12 in the present embodiment.

The front rotor core 12F and the rear rotor core 12R are fixed to the shaft 8 under the condition that: the field coil 14 is located between the shaft portions 12a and the rotor core claw magnetic poles 12b; the rotor core claw magnetic poles 12b (extending from the front rotor core 12F) and the rotor core claw magnetic poles 12b (extending from the rear rotor core 12R) are alternately arranged in the circumferential direction of the rotor 12; and the end of the shaft portion 12a of the rotor member 12F is in contact with the end of the shaft portion 12a of the rotor member 12R.

The front fan 13F serves as a cooling fan and is attached to one of outer ends (separated from each other in the direction of the rotational axis of the rotor 12) of the front rotor core 12F by welding or the like. The rear fan 13R serves as a cooling fan and is attached to one of outer ends (separated from each other in the direction of the rotational axis of the rotor 12) of the rear rotor core 12R by welding or the like. The front fan 13F and the rear fan 13R are arranged so that air flows toward a central portion of the rotor 12 due to the rotation of the rotor 12. The front fan 13F has the blades integrated with the front fan 13F. The rear fan 13R has the blades integrated with the rear fan 13R. Each of the blades is a protruding portion and made of a metal plate. In addition, the blades included in the front fan 13F are arranged in the circumferential direction of the front fan 13F, while the blades included in the rear fan 13R are arranged in the circumferential direction of the rear fan 13R. The blades arranged in a part of the circumference of each of the fans 13F and 13R are formed in a substantially arc shape and bent at a substantially right angle by pressing and have a surface inclined to the radial direction of the fan. The front fan 13F is fixed to the outer end (of the two outer ends separated from each other in the direction of the rotational axis of the rotor 12) of the front rotor core 12F in an integrated manner by welding. The rear fan 13R is fixed to the outer end (of the two outer ends separated from each other in the direction of the rotational axis of the rotor 12) of the rear rotor core 12R in an integrated manner by welding. The front fan 13F, the rear fan 13R, and the rotor 12 allow air to flow.

Next, the stator 17 is described in detail. As shown in FIG. 1, the stator core 17a has thin plates that are laminated and formed in a coil-like shape. Each of the thin plate included in the stator core 17a is made of a magnetic material. The stator core 17a also has a plurality of slots (not shown) in an inner circumferential surface of the stator core 17a. The number of the slots are determined on the basis of the number of the rotor core claw magnetic poles 12b and arranged at equal intervals. The three-phase pre-wound stator coil 17b is inserted in the slots and connected by Y-connection or triangle connection. Insulator sheets (that are insulating members) are inserted in the slots to prevent the stator coil 17b inserted in the slots from being exposed to the inner circumferential surface of the stator core 17b.

In the present embodiment, the number of magnetic poles that are provided for one phase and included in the stator 17 is 12 and the same as the number of the magnetic poles included in the rotor 12.

The surface of the stator coil 17b is coated by varnish or the like to cause the stator coil 17b to be insulated. A terminal of the stator coil 17b passes through the rear housing 2 and is connected to a terminal 15a of the rectification circuit 15. An insulating paper (that is an insulating member) may be arranged between the stator core 17a and the stator coil 17b.

The following describes the configuration of diffusers that are inclined to improve a cooling effect.

Figure 2:
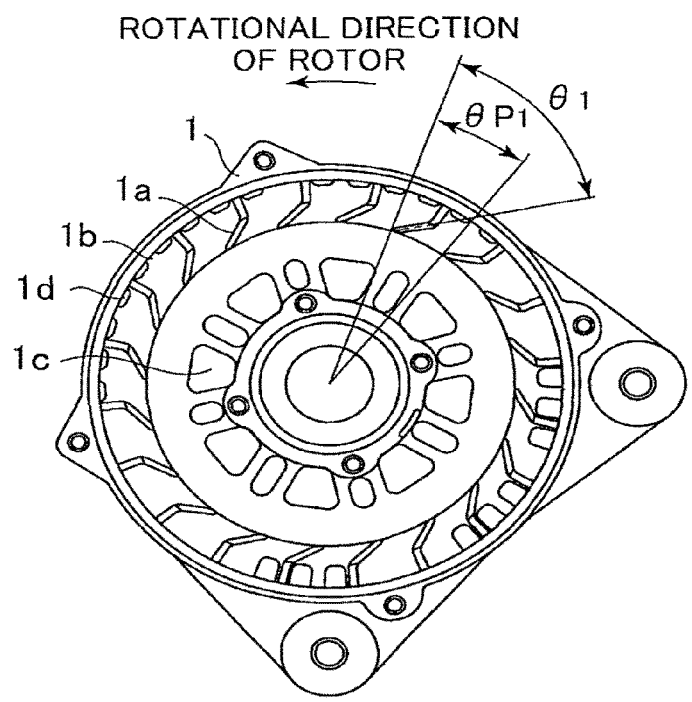
FIG. 2 is a diagram showing a back surface of a front housing (when viewed from the side opposite to the side of a pulley).
Figure 3:
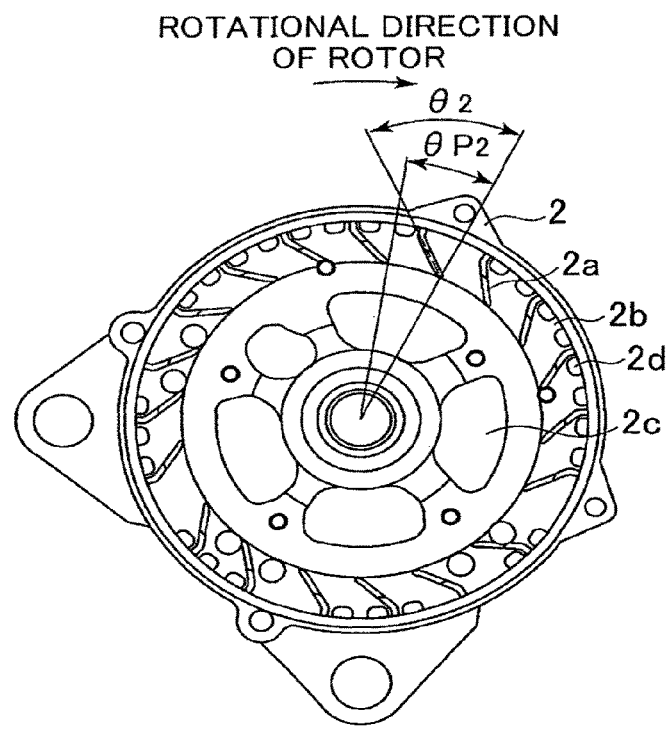
FIG. 3 is a diagram showing a back surface of a rear housing (when viewed from the side of the pulley).

The front housing 1 has a plurality of intake ports 1c formed in a side wall portion of the front housing 1, and the rear housing 2 has a plurality of intake ports 2c formed in a side wall portion of the rear housing 2, as shown in FIGS. 1 to 3. Air flows through the intake ports 1c and the intake ports 2c.

Figure 4:
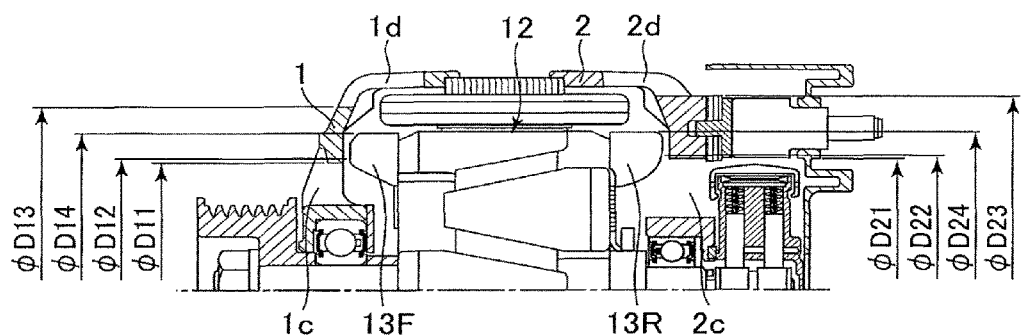
FIG. 4 is a vertical cross sectional view of the alternator.

As shown in FIG. 4, an outer radius φD11 indicates a distance between the rotational axis of the rotor 12 and a point (that is the farthest point from the rotational axis of the rotor 12 among all points of each intake port 1c) of each of the intake ports 1c, and a outer radius φD21 indicates a distance between the rotational axis of the rotor 12 and a point (that is the farthest point from the rotational axis of the rotor 12 among all points of each intake port 2c) of each of the intake ports 2c. In addition, a radius φD12 indicates an inner radius of each of the blades included in the front fan 13F (attached to the end face of the rotor 12 having the housings 1 and 2 that face each other). A radius φD22 indicates an inner radius of each of the blades included in the rear fan 13R (attached to the other end face of the rotor 12 having the housings 1 and 2 that face each other). The radius φD11 is equal to or smaller than the radius φD12. The radius φD21 is equal to or smaller than the radius φD22.

The front housing 1 has a plurality of discharge ports (openings) 1d on the outer circumferential side of the front housing 1. The discharge ports 1d are arranged in the circumferential direction of the front housing 1. The rear housing 2 has a plurality of discharge ports (openings) 2d on the outer circumferential side of the rear housing 2. The discharge ports 2d are arranged in the circumferential direction of the rear housing 2. In FIG. 4, a radius φD13 of a bottom end of each discharge port 1d indicates a distance between the rotational axis of the rotor 12 and a point (that is the closest point from the rotational axis of the rotor 12 among all points of the discharge port 1d) of the discharge port 1d, and a radius φD23 of a bottom end of each discharge port 2d indicates a distance between the rotational axis of the rotor 12 and a point (that is the closest point from the rotational axis of the rotor 12 among all points of the discharge port 2d) of the discharge port 2d. A radius φD14 indicates an outer radius of each blade included in the front fan 13F. A radius φD24 indicates an outer radius of each blade included in the rear fan 13R. The radius φD13 is equal to or larger than the radius φD14. The radius φD23 is equal to or larger than the radius φD24.

A plurality of diffusers 1a circumferentially provided are formed integrally with an inner wall surface 1E of a corner portion of the front housing 1. Likewise, a plurality of diffusers 2a circumferentially provided are formed integrally with an inner wall surface 2E of a corner portion of the rear housing 2.

As shown in FIGS. 2, 3, 5, and 6, the diffusers 1a are inclined at a predetermined angle θ1, and the diffusers 2a are inclined at a predetermined angle θ2. The diffusers 1a and 2a are inclined toward the side opposite to the rotational direction of the rotor 12. That is, the diffusers 1a are inclined toward the same direction as an inclination (angle) θ3 of each of the blades included in the front fan 13F, and the diffusers 2a are inclined toward the same direction as an inclination (angle) θ4 of each of the blades included in the rear fan 13R. The angle θ1 is determined on the basis of the inclination angle θ3, and the angle θ2 is determined on the basis of the inclination angle θ4.

Figure 5:
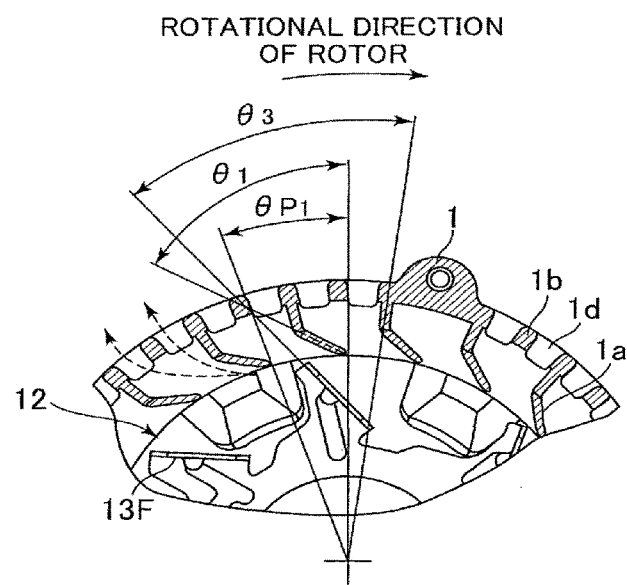
FIG. 5 is a left side view of main parts of the alternator (when viewed from the side of the pulley).
Figure 6:
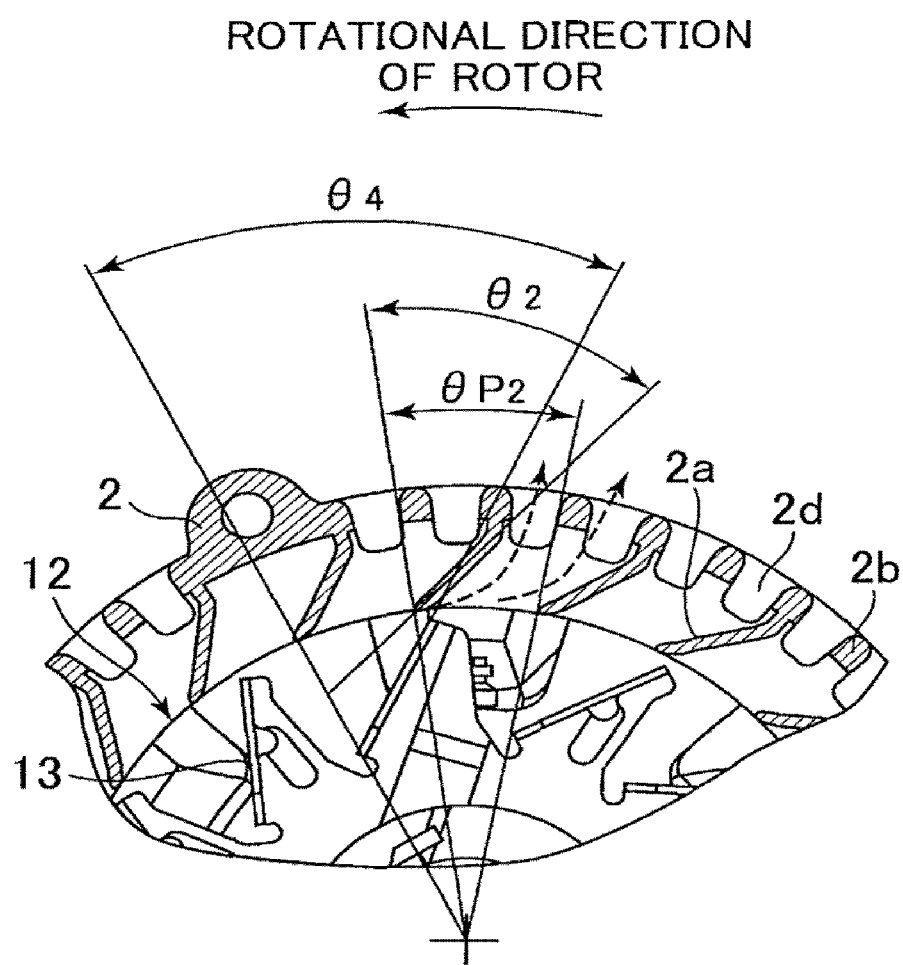
FIG. 6 is a right side view of main parts of the alternator (when viewed from the opposite side of the pulley).

The diffusers 1a are located on the outer side of the front housing 1 with respect to the outer radius φD14 of the front fan 13F. The diffusers 2a are located on the outer side of the rear housing 2 with respect to the outer radius φD24 of the rear fan 13R. Reference symbol θp1 denotes the interval at which the diffusers 1a are arranged, as shown in FIG. 5. Reference symbol θp2 denotes the interval at which the diffusers 2a are arranged, as shown in FIG. 6. The front housing 1a has ribs 1b that form the discharge ports 1d, while the rear housing 2a has ribs 2b that form the discharge ports 2d. The discharge ports 1d are located circumferentially on the outer peripheral portion of the front housing 1. Likewise, the discharge ports 2d are located circumferentially on the outer peripheral portion of the rear housing 2. The diffusers 1a extend to the respective ribs 1b as shown in FIG. 5, while the diffusers 2a extend to the respective ribs 2b as shown in FIG. 6. The ribs 1b are farther from the rotational axis of the rotor 12 than the bottom ends of the discharge ports 1d, while the ribs 2b are farther from the rotational axis of the rotor 12 than the bottom ends of the discharge ports 2d. If an obstacle such as a hole or a screw, which disturbs installation of the diffusers 1a, is present and overlaps any one or more of the diffusers 1a, then the diffusers 1a may be arranged at different intervals in the circumferential direction of the front housing 1. If an obstacle such as a hole or a screw, which disturbs installation of the diffusers 2a, is present and overlaps any one or more of the diffusers 2a, then the diffusers 2a may be arranged at different intervals in the circumferential direction of the rear housing 2.

The interval θp1 of the diffusers 1a is determined on the basis of the ribs 1b and the interval of the blades included in the front fan 13F. The interval θp2 of the diffusers 2a is determined on the basis of the ribs 2b and the interval of the blades included in the rear fan 13R.

Next, operations of the generator according to the present embodiment are described.

When the engine starts, the rotation of the engine is transferred from a crank shaft through the belt to the pulley 9. Thus, the pulley 9 rotates the rotor 12 through the shaft 8. When the brushes 11 supply a direct current through the slip rings 10 to the field coil 14 located in the rotor 12, a magnetic flux is generated around inner and outer circumferences of the field coil 14. Thus, a north pole or a south pole is alternately formed at the rotor core claw magnetic poles 12b (included in the rotor 12) in the circumferential direction of the rotor 12. The magnetic flux generated by the field coil 14 circles from the rotor core claw magnetic poles 12b (north poles) included in the front rotor core 12F to the stator coil 17b included in the stator 17. Then, the magnetic flux reaches the rotor core claw magnetic poles 12b (south poles) included in the rear rotor core 12R. Thus, the magnetic flux forms a magnetic circuit extending to the rotor 12 and the stator 17. Since the magnetic flux generated by the rotor 12 intersects the stator coil 17b, an alternating current induced voltage is produced across the U-phase, V-phase, and W-phase stator coil 17b. Thus, the three-phase alternating current induced voltage is produced.

The alternating current voltage produced in the aforementioned way is full-wave rectified and converted into a direct current voltage by the rectification circuit 15. The IC regulator (not shown) controls a current to be supplied to the field coil 14 so that the rectified direct current voltage is approximately 14.3 V and constant.

When the rotor 12 rotates, the front fan 13F and the rear fan 13R rotate with the rotation of the rotor 12. Thus, airflow shown by arrows (broken lines) of FIG. 1 is formed. The air flow is directed from the outside of the generator into the generator in the axial direction and directed to the outside of the generator in the outer circumferential direction.

The front fan 13F rotates to take air from the outside of the generator in the axial direction through the intake ports 1c (located in an outer circumferential portion of the ball bearing 7a attached to the front housing 1). When the air taken by the front fan 13F flows toward the outer circumference of the front housing 1 due to a centrifugal force generated by the blades of the front fan 13F, the flow of the air is adjusted by the diffusers 1a as shown by arrows (broken lines) of FIG. 5. The air is then discharged from the discharge ports 1d located circumferentially in the outer peripheral portion of the front housing 1.

One of side surfaces of the stator 17 and an outer surface of the stator 17 are fixed under the condition that the side surface and outer surface of the stator 17 are in contact with the front housing 1. Thus, heat generated by the stator 17 is transferred to the front housing 1 and released from the surface of the front housing 1. The heat released from the front housing 1 is discharged to the outside of the generator by the air that flows toward the discharge ports 1d. Thus, the stator coil 17b included in the stator 17 can be cooled. The diffusers 1a also serves as heat releasing fins. In the present embodiment, since the diffusers 1a are inclined toward the side opposite to the rotational direction of the rotor 12, the cooling effect is improved.

The rear fan 13R rotates to take air from the outside of the generator in the axial direction through the intake ports 5a (formed in an outer end portion of the rear cover 5), holes (that are open and formed in end faces (separated from each other in the axial direction) of the rear cover 5 on the inner circumferential side), the rectification circuit 15, and the intake ports 2c (formed in an outer circumferential portion of the ball bearing 7b attached to the rear housing 2). When the air taken by the rear fan 13R flows toward the outer circumference of the rear housing 2 due to a centrifugal force generated by the blades of the rear fan 13R, the flow of the air is adjusted by the diffusers 2a as shown by arrows (broken lines) of FIG. 6. The air is then discharged from the discharge ports 2d that are located circumferentially in the outer peripheral portion of the rear housing 2. Thus, the heat generated by the stator 17 and the heat transferred to the rear housing 2 are released from the surface of the rear housing 2 in the same way of the front housing 1. Thus, the stator coil 17b included in the stator 17 can be cooled by the air that flows toward the discharge port 2d. The diffusers 2a also serves as heat releasing fins. In the present embodiment, since the diffusers 2a are inclined toward the side opposite to the rotational direction of the rotor 12, the cooling effect is improved.

Rotation of the fans 13F and 13R produces a difference between pressure applied to the front fan 13F and pressure applied to the rear fan 13R. The pressure difference causes air to flow between the magnetic poles of the rotor 12 and between the rotor 12 and the stator 17. In the present embodiment, since the pressure applied to the rear fan 13R becomes large, air flows from the side of the front housing 1 through a gap between the rotor 12 and the stator 17 and a gap between the magnetic poles included in the rotor 12 toward the side of the rear housing 2 so that the rotor 12 and the stator 17 are cooled.

What is claimed is:

1. An electrical rotating machine comprising:
    a rotor having a cooling fan on an end face of the rotor;
    a stator arranged opposite the rotor, the stator having a stator coil;
    a housing holding the rotor and the stator;
    a plurality of intake ports provided in a side wall portion of the housing;
    a plurality of discharge ports provided circumferentially in an outer peripheral portion of the housing; and
    a plurality of diffusers provided circumferentially on an inner wall surface of a corner portion of the housing,
    wherein each of the diffusers is inclined such that its outer edge forms a leading edge relative to the rotational direction of the rotor, and
    wherein the diffusers have ends extending to respective ribs that form the discharge ports.

2. The electrical rotating machine according to claim 1, wherein
    an outer radius of each of the intake ports is equal to or smaller than an inner radius of each of blades of the cooling fan, and
    a radius of a bottom end of each of the discharge ports is equal to or larger than an outer radius of each of the blades of the cooling fan.

3. The electrical rotating machine according to claim 1, wherein the diffusers are located, at equal intervals, on the radially outer side of blades of the cooling fan.

4. The electrical rotating machine according to claim 1, wherein the diffusers are located, at different intervals, on the radially outer side of blades of the cooling fan.

5. An electrical rotating machine comprising:
    a rotor having a cooling fan on an end face of the rotor;
    a stator arranged opposite the rotor, the stator having a stator coil;
    a housing holding the rotor and the stator;
    a plurality of intake ports provided in a side wall portion of the housing;
    a plurality of discharge ports provided circumferentially in an outer peripheral portion of the housing; and
    a plurality of diffusers provided circumferentially on an inner wall surface of a corner portion of the housing, the diffusers inclining toward the side opposite to a rotational direction of the rotor,
    wherein radially outer edges of the diffusers are located on the radially outer side of the bottom ends of the discharge ports.

* * * * *